United States Patent [19]

Richardson et al.

[11] Patent Number: 5,361,175

[45] Date of Patent: Nov. 1, 1994

[54] CALIBRATION OF CIRCUITRY FOR MEDIA VERIFICATION IN A MAGNETIC DATA RECORDING DEVICE

[75] Inventors: Kenneth G. Richardson, Fort Collins; Mark A. Young, Loveland, both of Colo.

[73] Assignee: Hwelett-Packard Company, Palo Alto, Calif.

[21] Appl. No.: 40,760

[22] Filed: Mar. 31, 1993

[51] Int. Cl.⁵ .......................... G11B 5/09; G11B 5/035
[52] U.S. Cl. ........................................ 360/46; 360/65
[58] Field of Search ............... 360/25, 31, 45, 46, 360/53, 67, 65

[56] References Cited

U.S. PATENT DOCUMENTS

| | | | |
|---|---|---|---|
| 4,516,162 | 5/1985 | West | 360/25 |
| 4,635,142 | 1/1987 | Haugland | 360/46 |
| 4,688,113 | 8/1987 | Parsons | 360/31 |
| 5,150,050 | 9/1992 | Genheimer et al. | 360/31 |

Primary Examiner—Donald Hajec
Assistant Examiner—Won Tae C. Kim
Attorney, Agent, or Firm—Augustus W. Winfield

[57] ABSTRACT

A system and method for calibrating amplifier gain and a comparator threshold for use in verification of magnetic media integrity in a magnetic data storage device. Commercially available read data processors are used which have an amplifier with controllable gain and a comparator with an internal indirectly-controllable threshold. An on-board voltage reference is provided for gain calibration. The calibrated gain is used to provide signals with known peak values for calibrating the comparator threshold. In one embodiment, the numeric control value for the threshold is reduced from a calibrated peak value to a specified fraction for media verification. In a second embodiment, the gain is reduced to the industry specified fraction and the threshold is calibrated to match peak signal magnitudes at the reduced gain. The gain is then returned to the calibrated level for media verification.

12 Claims, 4 Drawing Sheets

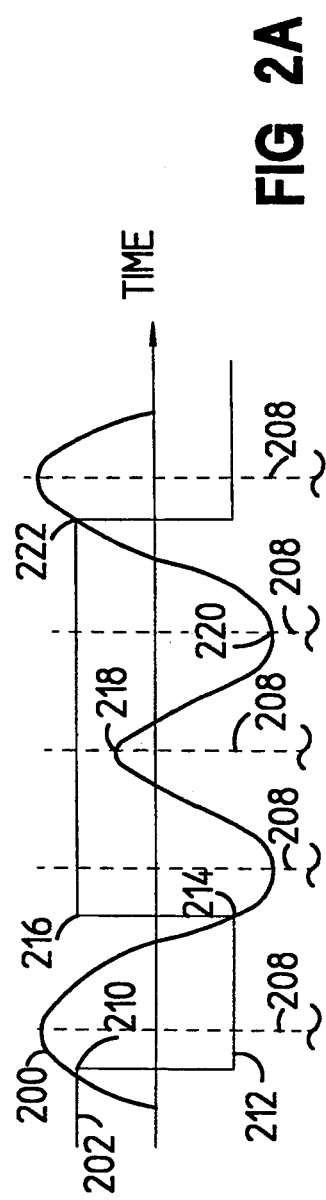
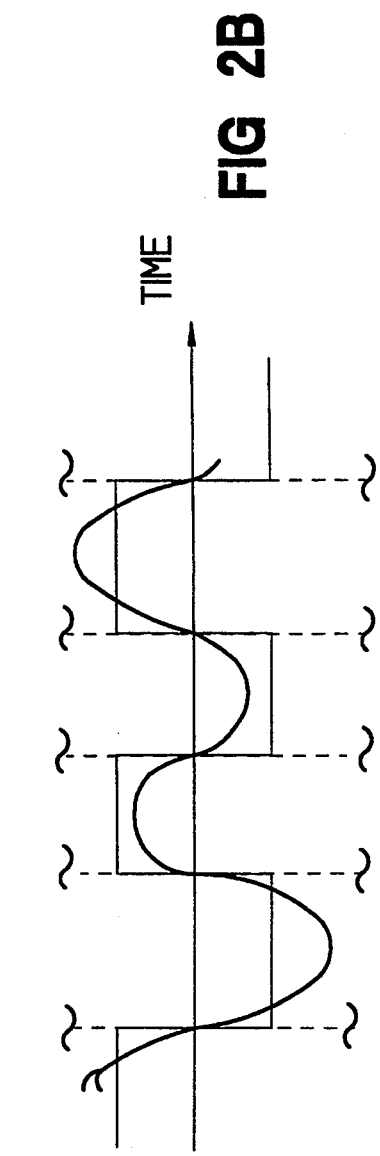
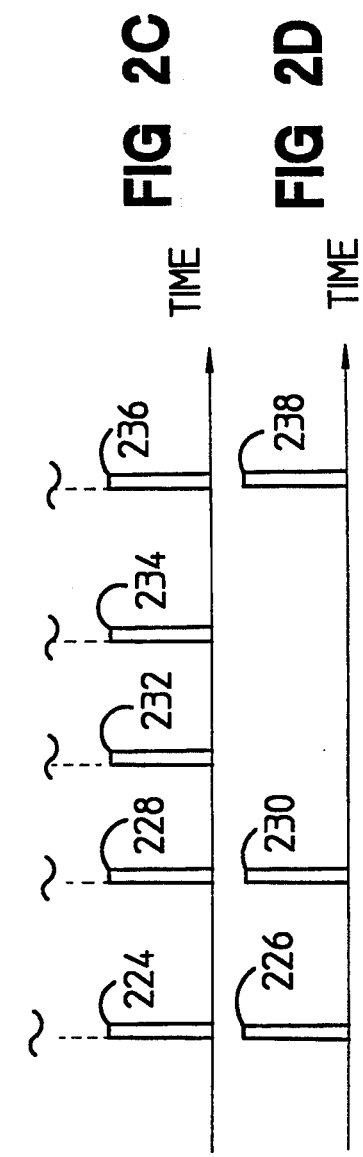

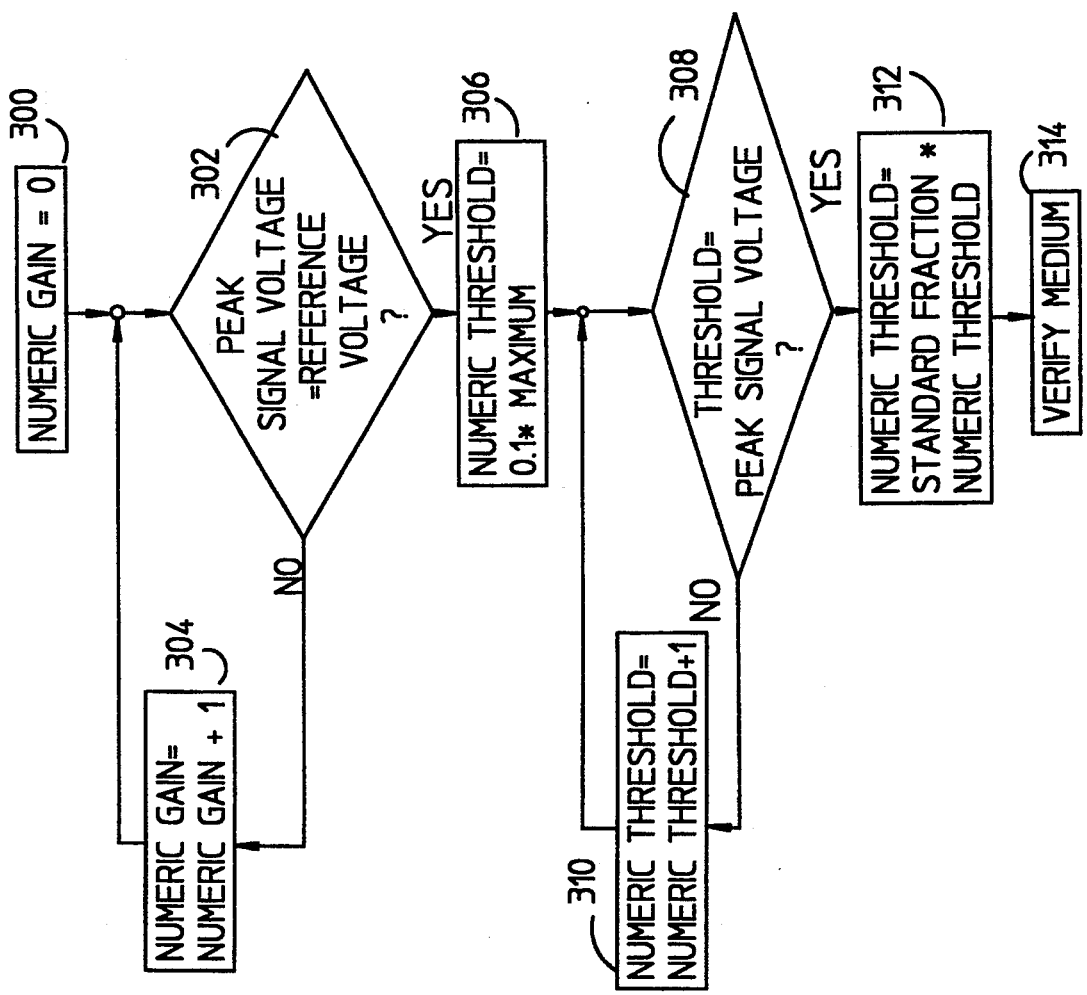

CALIBRATION OF CIRCUITRY FOR MEDIA VERIFICATION IN A MAGNETIC DATA RECORDING DEVICE

FIELD OF INVENTION

This invention relates generally to magnetic data storage devices and more specifically to automatic calibration of a voltage threshold used to detect detects in the magnetic medium after formatting.

BACKGROUND OF THE INVENTION

In magnetic data recording devices such as disk drives and tape drives, a magnetic medium is typically formatted into sectors. Sectors are typically the smallest addressable units of dam. The magnetic properties of a particular magnetic medium typically vary considerably over the surface of the medium. After formatting, each sector is typically tested for defects by verifying that the magnitude of resulting data signals exceeds some threshold value. Any sector which does not qualify is marked as unusable.

In devices with unremovable media such as rigid disk drives, the quality measure for sector verification can include the combination of drive and media. That is, both the electronics and the media can vary and what matters is the performance of the combination. However, for removable media devices such as flexible disk drives and tape drives, the drive and the medium must each meet independent absolute minimum specifications to ensure interchange between drives. Industry specifications for interchange require each drive to have the ability to verify that a newly formatted medium conforms to an absolute media specification.

An example industry specification for interchangeable tapes is the QIC-80 Development Standard (Revision I, Sep. 2, 1992, available from Quarter-Inch Cartridge Drive Standards, Inc., 311 East Carrillo Street, Santa Barbara, Calif. 93101). This standard provides for a reference tape cartridge which can be used to calibrate drives. When a tape cartridge is exchanged between calibrated drives, a particular magnetic transition should result in a standard signal amplitude at a standard point in the drive. During verification, any sector having a read signal which drops below 47% of a standard amplitude is eliminated as a defective sector.

Integrated circuits are commercially available which contain much of the circuitry used for reading magnetically recorded data. It is desirable to also use such circuits for media verification in addition to data reading. However, in general, the data reading circuitry may not provide the precision and absolute standards needed to meet industry precision standards for media verification. The present invention provides precise verification with commercially available parts which do not inherently provide the necessary precision. The following discussion provides additional technical background for the present invention.

In a typical magnetic data recording device, binary data is recorded along a track in a magnetic medium by alternately magnetizing small areas from one magnetic polarity to the opposite polarity. The data is encoded in the timing of the polarization reversals, not in the polarity of magnetization. The process of reading typically employs a magnetic head which has a voltage output which is proportional to the rate of change of a magnetic field. For data, the rate of change of the magnetic field (and corresponding voltage) is highest at a boundary where the magnetic polarity reverses. Therefore, the data which was encoded in the timing of magnetic reversals during recording is encoded in the timing of signal peaks during reading. Rather than detect the timing of peaks, the voltage signal is typically differentiated so that peaks in the non-differentiated signal become zero crossings in the differentiated signal. Therefore, in the differentiated signal, the data is encoded in the timing of zero crossings.

With noise, there may be transient zero crossings in the differentiated signal which do not correspond to a magnetic polarity reversal. One solution to help distinguish valid signals from noise is to use a dual path detection system. One path uses the original non-differentiated signal and the other path uses the differentiated signal. In the non-differentiated signal path, the voltage peaks are compared to a predetermined voltage threshold using an analog comparator. The comparator output in the non-differentiated path is used to qualify zero crossings in the differentiated path as follows. During the time window that a voltage peak in the non-differentiated path is opposite in polarity to the previous peak and greater in magnitude than the threshold, any zero crossings in the differentiated path are assumed to be valid. If however the peak voltage in the non-differentiated path is of the same polarity as the previous peak or has a magnitude below the threshold, any zero crossings in the differentiated path during that time are rejected as noise.

Circuitry providing dual path detection with qualification as described above is contained within commercially available integrated circuits. For example, the SSI 32P541 Read Data Processor (Silicon Systems Inc., 14351 Myford Road, Tustin, Calif. 92680) contains circuitry for performing the functions described. In addition, there are compatible parts from multiple other vendors. In this compatible family of commercially available read data processor circuits, the comparator in the non-differentiated path has hysteresis. The circuits have an external hysteresis input for controlling the amount of hysteresis. The comparator hysteresis provides two thresholds, one for each polarity of peaks. If a peak exceeds one threshold, the hysteresis switches the threshold to the opposite polarity so that only an opposite polarity peak can toggle the comparator output. These commercially available circuits also provide a rectified signal output.

The design approach suggested by the vendors of the commercially available read data processors is to filter the rectified signal output to provide a peak detector and to use a fixed fraction of the peak detector voltage to control the hysteresis level of the comparator. Ideally, the comparator threshold level is then a fixed percentage of the absolute value of the peak signal voltage, varying linearly as the peak signal level varies.

For media verification, there are several problems which are not solved by the commercially available integrated circuits discussed above. First, with an unknown medium being verified, there is no standard amplitude signal available. Second, the actual threshold voltage resulting from a particular fixed hysteresis input voltage varies from part to part. This variation is acceptable for the intended function of qualification of zero crossings. However, more precision is needed if these parts are to be used for verification.

SUMMARY OF THE INVENTION

The present invention provides a system and a method for using commercially available read data processor circuits to verify media integrity to precise industry standards. In the present invention, an on-board standard reference voltage is provided for calibration. After formatting, a signal is read from the medium and the closed-loop gain of the amplifier is set so that the amplified signal peaks equal the on-board reference voltage. In one embodiment, the threshold levels are then calibrated to the calibrated voltage peaks. Then, the digital threshold control is reduced to a percentage of the calibrated value, where the percentage is specified by industry standards for verification. In general, in commercially available circuits, the closed-loop amplifier gain control is more consistent from part to part and is more linear than the control for the threshold levels. Therefore, in a second embodiment having better precision, the closed-loop gain control is reduced by the specified percentage, and the comparator threshold is calibrated to the peak voltages resulting from the reduced gain. Then, the gain is restored to the first calibrated value for media verification. For either embodiment, the medium integrity is then verified with gain fixed at its calibrated value and the comparator threshold fixed at the verification value. Any sector read which does not result in the proper known data is eliminated as a defective sector.

BRIEF DESCRIPTION OF THE DRAWINGS

FIG. 2A illustrates signal voltage waveforms in conjunction with the present invention.

FIG. 2B illustrates signal voltage waveforms in conjunction with the present invention.

FIG. 2C illustrates signal voltage waveforms in conjunction with the present invention.

FIG. 2D illustrates signal voltage waveforms in conjunction with the present invention.

FIG. 3 is a flow chart illustrating the method for a first embodiment of the present invention.

DETAILED DESCRIPTION OF THE PREFERRED EMBODIMENT OF THE INVENTION

Figure 1:
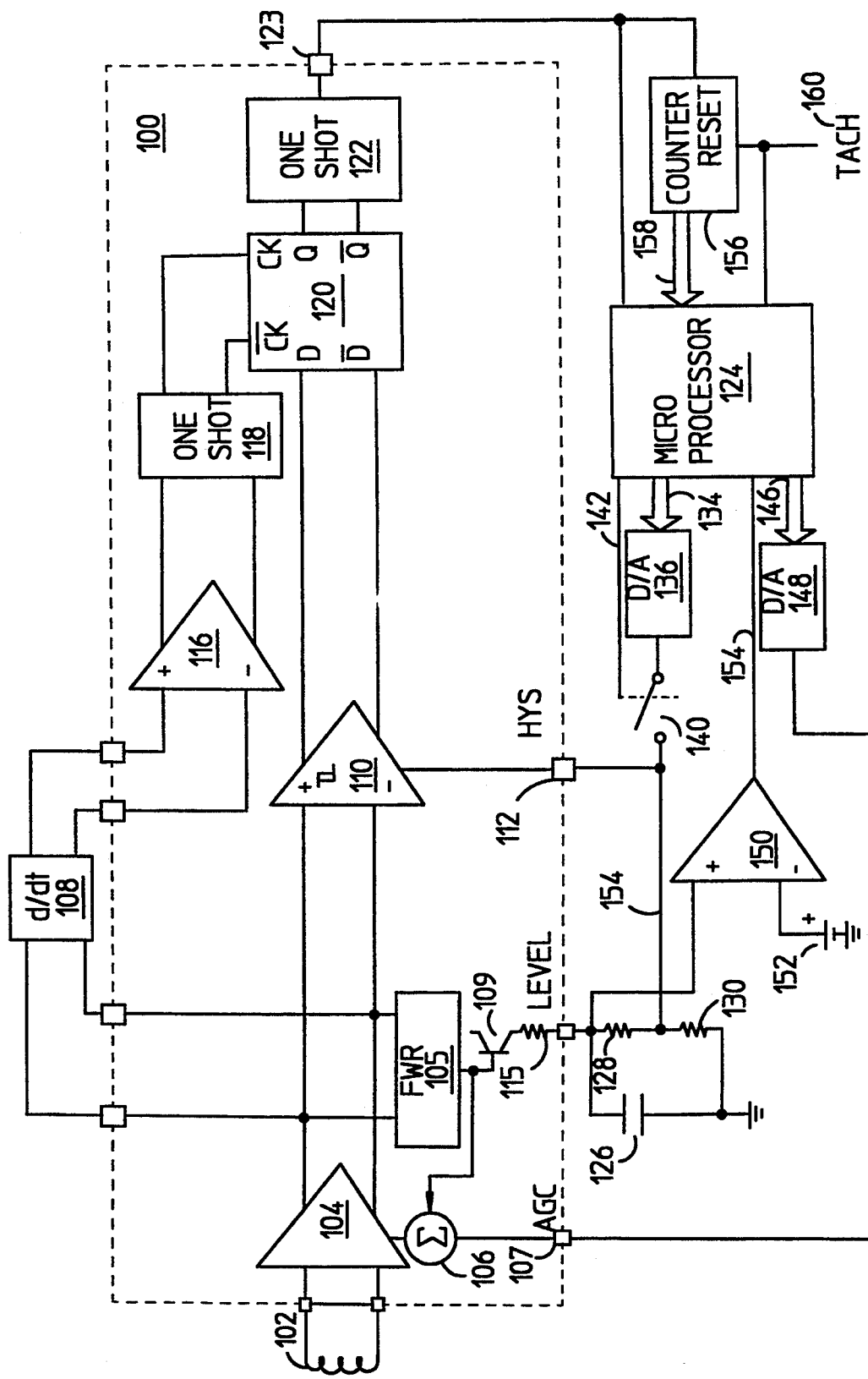
FIG. 1 is a simplified schematic of the circuitry in the present invention.

FIG. 1 illustrates a simplified schematic of the present invention. Box 100 is a commercially available integrated circuit for processing raw signals being read from a magnetic medium. Coil 102 represents a sensing coil in a magnetic head for sensing a changing magnetic field. Coil 102 is connected to an amplifier 104 which has an internal closed-loop gain path comprising a full wave rectifier (FWR) circuit 105 and summing junction 106. The closed-loop gain path controls the peak voltage output of amplifier 104 to equal a magnitude determined by an external gain control input voltage 107 (AGC). The outputs of the amplifier 104 go to two signal processing paths. First, the outputs go to external circuitry 108 for differentiating the signal. Second, the outputs go to an analog comparator 110 which has an external threshold control input 112 (HYS). The external differentiator circuitry (108) outputs go to an analog comparator 116 which detects zero crossings. Each transition of the state of comparator 116 is converted into a pulse by one-shot 118. One-shot 118 outputs are used to clock a D flip-flop 120. The D inputs of flip-flop 120 are the binary outputs of comparator 110. Each state change of flip-flop 120 is converted to a pulse by one-shot 122. The pulses from the output 123 of one-shot 122 are sensed by an external microprocessor 124.

The output of FWR 114 goes through an emitter follower circuit 109 through an output 115 (LEVEL) to an external capacitor 126 for voltage peak detection. The detected voltage peaks are divided by resistors 128 and 130 to provide a fraction 132 of the peak voltage 115. Fraction 132 is connected to the hysteresis input 112 of comparator 110. An external comparator 150 compares the peak voltage 115 to a standard reference voltage 152. The standard reference voltage 152 may be realized for example by a resistor divider, from a power supply. The external comparator 150 provides a binary output 154 to the microprocessor 124.

The microprocessor 124 also has a digital output 134 to a digital-to-analog converter (D/A) 136 which has an analog voltage output 138. The analog voltage output 138 can be switched to the hysteresis input 112 through an analog switch 140 which is controlled by microprocessor 124 by a switch control line 142. The analog switch 140 may be realized for example by a single transistor emitter follower circuit. A second D/A 148 converts a digital output 146 to the analog gain signal 107 for amplifier 104.

The data output pulses 123 also go to a counter 156 which has a count output 158 which can be read by processor 124. The counter 156 has a reset input which is controlled by a tachometer (TACH) signal 160 which is a signal from the motor control circuitry (not illustrated) which represents a fixed distance on the medium.

FIGS. 2A–2D illustrate various voltage waveforms to facilitate understanding of the circuitry of FIG. 1. In FIG. 2A, waveform 200 represents a signal from the output of amplifier 104 (FIG. 1). The waveform 200 as illustrated is not intended to represent an actual signal but instead is intended to illustrate zero-crossing qualification. In FIG. 2A, waveform 202 represents the threshold of comparator 110 (FIG. 1) (and also corresponds to the digital output of the comparator 110) in response to waveform 200. In FIG. 2B, waveform 204 represents the output of differentiation circuitry 100 (FIG. 1) in response to waveform 200. In FIG. 2B, waveform 206 represents the output of the zero crossing comparator 116 (FIG. 1). FIG. 2C represents the output of one-shot 118 (FIG. 1) in response to waveform 200. FIG. 2D represents the output of one-shot 122 (FIG. 1) in response to waveform 200. Note that at each dashed line 208, a peak in waveform 200 (FIG. 2A) results in a zero-crossing of differentiated waveform 204 (FIG. 2B) which in turn results in a pulse (FIG. 2C) from one-shot 118 (FIG. 1).

In FIG. 2A, waveform 200 first exceeds the threshold voltage 202 at point 210, causing the state of comparator 110 to switch, which in turn switches the threshold to the opposite polarity 212. Waveform 200 exceeds the threshold voltage 202 in the opposite polarity at 214, again switching the state of comparator 110 and the polarity of the threshold voltage 202. Waveform 200 has a peak 218 which does not exceed the threshold voltage 202. Waveform 200 has a peak 220 which is equal in magnitude to prior peaks which caused switching (for example point 214) but the polarity at 220 is the same as the polarity at the previous switch at 214. Since the threshold is at the opposite polarity at 220, comparator 110 does not switch states. Finally, waveform 200 exceeds the threshold voltage 202 in the proper polarity at 222, again causing comparator 110 to switch states.

In FIG. 2C, just prior to the time of pulse 224, the D input of flip-flop 120 (FIG. 1) toggled as a result of comparator 110 switching states at point 210 (FIG. 2A). Therefore, pulse 224 clocks in a change of state for flip-flop 120 resulting in output pulse 226 (FIG. 2D). Similarly, pulse 228 (FIG. 2C) results in output pulse 230 (FIG. 2D). However, since the comparator 110 output does not change states between point 216 and point 222 (FIG. 2A), pulses 232 and 234 (FIG. 2C) do not clock in a state change for flip-flop 120 (FIG. 1). Therefore, pulses 232 and 234 (FIG. 2C) do not result in corresponding output pulses (FIG. 2D). Therefore, only those zero crossings of FIG. 2B which have been "qualified" by comparator 110 (FIG. 1) as resulting from peaks which exceed the threshold in the proper polarity (FIG. 2A) result in corresponding output pulses (FIG. 2D).

The above discussion for FIGS. 2A-2D illustrates the function of comparator 110 (FIG. 1) as a data qualifier. The present invention uses the same functionality of comparator 110 for a second purpose: to verify newly formatted media. In particular, the present invention calibrates the peak output of amplifier 104 to an external reference voltage and then uses the calibrated peak output to enable microprocessor 124 to calibrate the threshold voltage for comparator 110 to a precise value for media verification. The following discussion illustrates how the present invention calibrates the gain and threshold to precise values.

FIG. 3 illustrates the method for one embodiment of the present invention. The following description of FIG. 3 also references appropriate parts of FIGS. 1 and 2. As mentioned in the background section, the read data processor 100 (FIG. 1) does not provide an independent absolute signal level. In addition, the actual threshold voltage resulting from a voltage at the HYS input 112 is not consistent from part to part. In the present invention, the microprocessor 124 (FIG. 1) obtains an absolute signal level from the medium being verified by using D/A 148 (FIG. 1) to adjust the gain control 107 (FIG. 1) of amplifier 104 (FIG. 1) until voltage peaks 115 (FIG. 1) match the reference voltage 152 of external comparator 150 (FIG. 1) (see FIG. 3, 302 and 304). While continuing to read data 123 (FIG. 1) with the gain of amplifier 104 (FIG. 1) fixed at the result of step 302 (FIG. 3), the microprocessor controls switch 140 (FIG. 1) to switch the threshold control input 112 (FIG. 1) to D/A output 138 (FIG. 1). In the embodiment illustrated in FIG. 3, the numeric threshold input 134 (FIG. 1) is then adjusted until the internal thresholds of comparator 110 (FIG. 1) equal the voltage peaks as measured at the input of comparator 110 (see FIG. 3, 308 and 310). This is done by increasing the numeric threshold input 134 until the input signal no longer qualifies as data at the output 123 of one shot 122. At this point, the internal threshold of comparator 110 is equal to the reference voltage 152. Then, the microprocessor 124 reduces the numeric threshold 134 by the fraction specified by the appropriate standard for media verification (FIG. 3, 312). Then, the medium is verified with the gain precisely calibrated and the internal thresholds calibrated but less precisely than the gain. The precision of the internal thresholds depends on the linearity of the external threshold control input (HYS, FIG. 1, 112).

Figure 4:
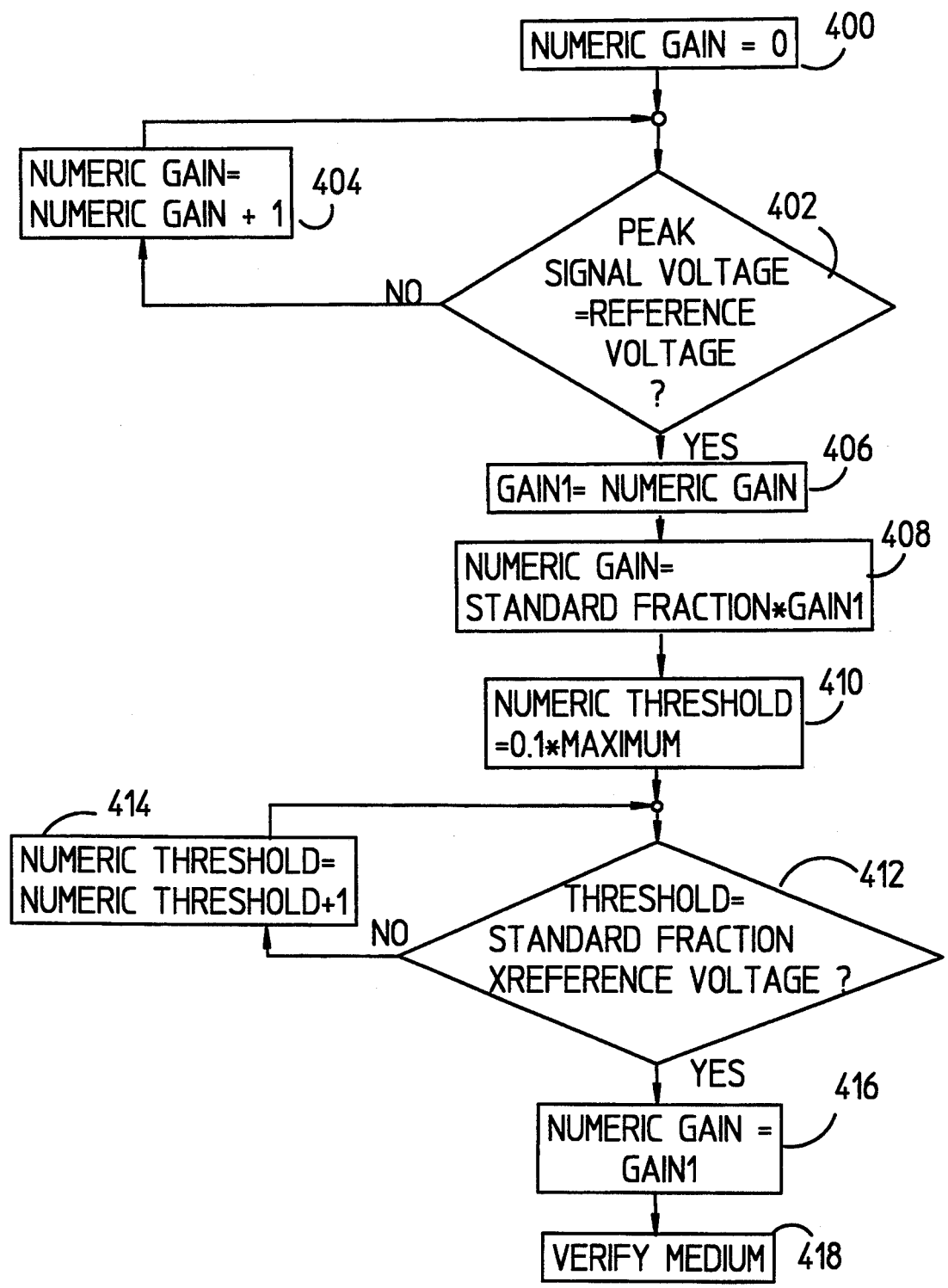
FIG. 4 is a flow chart illustrating the method for a second embodiment of the present invention.

In general, in commercially available circuits, the closed-loop amplifier gain control (AGC, FIG. 1, 107) characteristic is more consistent from part to part and is more linear than the threshold level control (HYS, FIG. 1, 112). FIG. 4 illustrates an alternative embodiment which takes advantage of the precision of the gain control. As in FIG. 3, the microprocessor 124 (FIG. 1) first obtains an absolute signal level from the medium being verified by using D/A 148 (FIG. 1) to adjust the gain control 107 (FIG. 1) of amplifier 104 (FIG. 1) until voltage peaks 115 (FIG. 1) match the reference voltage 152 of external comparator 150 (FIG. 1) (see FIG. 4, 402 and 404). For convenience, the corresponding numeric gain value 146 (FIG. 1) at this level of gain will be called GAIN1 (FIG. 4, 406). The numerical gain value 146 is then decreased by the appropriate percentage specified by the industry standard for media verification (FIG. 4, 408). For convenience this will be called GAIN2.

While continuing to read data with the numeric gain 146 of amplifier 104 set to GAIN2, the microprocessor controls switch 140 to switch the threshold control input 112 to output 138 of D/A 136. The microprocessor starts the numeric threshold control value 134 at a very low value (FIG. 4, 410) and increases the numeric value 134 until the number of zero crossings which qualify as data is substantially reduced (FIG. 4, 412 and 414). For convenience, this will be called THRESHOLD1.

When the numeric value 134 is at THRESHOLD1, the internal threshold of comparator 110 (FIG. 1) has been calibrated to match the peaks of signals from amplifier 104 (FIG. 1) which in turn match the industry specified fraction of the threshold voltage 152 of external comparator 150 (FIG. 1). While leaving the numeric value 134 at THRESHOLD1, the microprocessor 124 then returns the numeric gain control 146 of amplifier 104 to GAIN1 (FIG. 4, 416). The entire medium is then verified with the numeric gain control 146 of amplifier 104 fixed at GAIN1 and the numeric threshold control 134 of comparator 110 fixed at THRESHOLD1 (FIG. 4, 418). Any sectors with data errors are eliminated as defective. After verification, switch 140 is switched so that fraction 132 controls the threshold input 112 of comparator 110.

In FIG. 3 step 308 and in FIG. 4 step 412, the internal comparator threshold is set equal to calibrated signal peaks by increasing the numeric value 134 until data 123 is substantially reduced. In an example embodiment, the point at which data is substantially reduced is determined as follows. For an ideal signal having a pure sinusoidal wave shape, the number of peaks qualifying as data would not change until the threshold exceeded the peak value. Then, with the ideal waveform, the number of peaks qualifying as data would go to zero when the threshold just exceeded the peak value. For real data from a magnetic medium, valid data peaks vary in amplitude depending on the spacing of magnetic polarization reversals. In addition, there is a significant amount of noise in the signal. The level chosen in the example embodiments is the approximate average value of the peaks. At that level, about half of the peaks randomly exceed the threshold and half randomly fall below the threshold.

The average value of the peaks is determined as follows. Referring back to FIG. 1, at each trial level of numeric value 134, the microprocessor 124 averages multiple samples from counter 156. Each sample is a counter total read just before the counter 156 is reset by the TACH signal 160. Therefore, the microprocessor 124 computes the average number of zero crossings which qualify as data during a fixed distance on the medium. The point at which data 123 is substantially reduced is chosen to be the point at which the average number of zero crossings drops to half of the average value initially measured with the threshold at 0.1 times the maximum threshold.

In the embodiments illustrated in FIGS. 3 and 4, the gain is increased until peak voltages match the reference voltage and the numeric threshold is increased until the internal threshold matches calibrated peak voltages. Of course, gain could be started high and then be reduced until peak voltages match the reference voltage and the thresholds could be started high and then be reduced until data just starts to appear. In addition, the sign of either control could be inverted. For example, if an increase in numeric value 146 results in a decrease in the gain of amplifier 104 then FIG. 3, steps 300 and 304 and FIG. 4 steps 400 and 404 must be logically inverted.

From the above, it can be seen that the present invention provides a system and a method for using commercially available read data processor circuits to verify media integrity to precise industry standards. The present invention can be used for any magnetic data recording device such as rigid disk drives, flexible disk drives, and magnetic data tape drives. It is particularly useful for drives with removable media which require verification of unknown media to industry standards within the drive.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a magnetic dam storage device comprising; an amplifier having an amplifier signal input, an amplifier output, an amplifier gain which is adjustable and a gain control input, wherein the amplifier signal input is connected to a data signal; an analog comparator having a comparator signal input, a comparator output, a comparator threshold which is adjustable and a threshold control input, wherein the comparator signal input is connected to the amplifier output; a reference voltage; a method for calibrating the amplifier gain and the comparator threshold, the method comprising the following steps:
   a. reading the data signal with the amplifier;
   b. adjusting the amplifier gain control input until a peak voltage at the amplifier output equals the reference voltage, thereby calibrating the amplifier gain;
   c. adjusting the threshold control input until the comparator output indicates that the comparator threshold equals the peak voltage at the amplifier output, thereby calibrating the comparator threshold to be equal to the reference voltage; and
   d. reducing the threshold control input by a predetermined fraction, thereby setting the comparator threshold to the predetermined fraction of the reference voltage.

2. A method as in claim 1 wherein the magnetic data storage device is a flexible disk drive.

3. A method as in claim 1 wherein the magnetic data storage device is a tape drive.

4. In a magnetic data storage device comprising; an amplifier having an amplifier signal input, an amplifier output, an amplifier gain which is adjustable and a gain control input, wherein the amplifier signal input is connected to a data signal; an analog comparator having a comparator signal input, a comparator output, a comparator threshold which is adjustable and a threshold control input, wherein the comparator signal input is connected to the amplifier output; a reference voltage; a method for calibrating the amplifier gain and the comparator threshold, the method comprising the following steps:
   a. reading the data signal with the amplifier;
   b. adjusting the amplifier gain input until a first peak voltage at the amplifier output equals the reference voltage, thereby calibrating the amplifier gain;
   c. decreasing the amplifier gain input by a predetermined fraction, thereby providing a second peak voltage at the comparator signal input; and
   d. adjusting the threshold control input until the comparator output indicates that the comparator threshold equals the second peak voltage, thereby setting the comparator threshold to the predetermined fraction of the reference voltage.

5. A method as in claim 4 wherein the magnetic data storage device is a flexible disk drive.

6. A method as in claim 4 wherein the magnetic data storage device is a tape drive.

7. In a magnetic data storage device, a system for calibrated magnetic media verification, the system comprising:
   an amplifier having an amplifier signal input, an amplifier output, a gain which is adjustable and an amplifier gain input, wherein the amplifier signal input is connected to a data signal;
   a peak detector, having an input connected to the amplifier output and a peak detector output;
   a reference voltage;
   first comparator means connected to the peak detector output and to the reference voltage, for determining whether the peak detector output is equal to the reference voltage, wherein a calibrated gain is determined by adjusting the magnitude of the amplifier gain input so that the peak detector output equals the reference voltage;
   second comparator means having a signal input connected to the amplifier output, a threshold which is adjustable and a threshold control input, for determining whether a peak of the amplifier output equals the threshold, wherein a calibrated threshold is determined by adjusting the threshold control input so that the threshold equals the peak of the amplifier output when the amplifer gain is equal to the calibrated gain; and
   fraction means for generating a final threshold which is a predetermined fraction of the calibrated threshold.

8. A system as in claim 7 wherein the magnetic data storage device is a disk drive.

9. A system as in claim 7 wherein the magnetic data storage device is a tape drive.

10. In a magnetic data storage device, a system for calibrated magnetic media verification, the system comprising:

an amplifier having an amplifier signal input, an amplifier output, a gain which is adjustable and an amplifier gain input, wherein the amplifier signal input receives a data signal;

a peak detector, having an input connected to the amplifier output and a peak detector output;

a reference voltage;

a first comparator, connected to the peak detector output and to the reference voltage, having a first comparator output indicating whether the peak detector output is equal to the reference voltage;

a controller, receiving the first comparator output and having a first controller output electrically coupled to the amplifier gain input, the controller controlling the amplifier gain input so that the peak detector output equals the reference voltage;

fraction means for generating a second gain which is a predetermined fraction of the calibrated gain;

a second comparator, having a signal input connected to the amplifier output, a threshold which is adjustable and a threshold control input, and a second comparator output indicating whether a peak of the amplifier output equals the threshold; and the controller adjusting the threshold control input so that the threshold equals a peak of the amplifier output when the amplifier gain is equal to the second gain, thereby calibrating the variable threshold to the predetermined fraction of the reference voltage.

11. A system as in claim 10 wherein the magnetic data storage device is a disk drive.

12. A system as in claim 10 wherein the magnetic data storage device is a tape drive.

* * * * *